United States Patent
Lee et al.

(10) Patent No.: US 8,351,944 B2
(45) Date of Patent: Jan. 8, 2013

(54) SOFT HANDOVER FOR MOBILE DEVICE

(75) Inventors: Jay J. Lee, San Ramon, CA (US); Imtiyaz Shaikh, Pleasant Hill, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 523 days.

(21) Appl. No.: 12/485,404

(22) Filed: Jun. 16, 2009

(65) Prior Publication Data

US 2010/0317350 A1    Dec. 16, 2010

(51) Int. Cl.
*H04W 36/00*    (2009.01)

(52) U.S. Cl. .............. 455/437; 455/435.1; 455/435.2; 455/436; 455/441

(58) Field of Classification Search .................. None
See application file for complete search history.

(56) References Cited

U.S. PATENT DOCUMENTS

| | | | | |
|---|---|---|---|---|
| 5,189,734 | A * | 2/1993 | Bailey et al. | 455/438 |
| 5,640,414 | A * | 6/1997 | Blakeney et al. | 375/130 |
| 2003/0036384 | A1* | 2/2003 | Chen et al. | 455/437 |
| 2006/0121901 | A1* | 6/2006 | Tanaka et al. | 455/436 |
| 2008/0259876 | A1* | 10/2008 | Qiang et al. | 370/332 |
| 2009/0247186 | A1* | 10/2009 | Ji et al. | 455/456.1 |
| 2010/0054207 | A1* | 3/2010 | Gupta et al. | 370/331 |

* cited by examiner

*Primary Examiner* — Rafael Pérez-Gutiérrez
*Assistant Examiner* — Suhail Khan (57) ABSTRACT

A method implemented in a mobile device includes identifying a target wireless network for a handover, where the target wireless network uses a different access technology than an existing wireless network being used by the mobile device. The mobile device determines that a signal for the existing wireless network meets an early registration trigger threshold and initiates, based on the determining, an early registration of the mobile device with the target wireless network, where an early registration is performed at a sufficient time prior to the actual handover to preclude a registration delay associated with the handover to the different access technology.

20 Claims, 9 Drawing Sheets

SOFT HANDOVER FOR MOBILE DEVICE

BACKGROUND

Handover is the basic means of providing mobility in cellular network architectures. Handover occurs when a call has to be handed off from one cell to another, as the user moves between cells. For a user having an ongoing communication and crossing a cell edge, it is necessary to use radio resources in the "new" cell, also called the target cell, because the signal strength from the "old" cell deteriorates as the user moves closer to the target cell. The whole process of tearing down an existing connection in the old or current cell and establishing a new connection in the target cell may be referred to as handover. Handover between base stations from the same access network technology is well defined. However, when handover is taking place between different technologies, it may take several seconds to register with the target network. In a particular example, when a mobile device moves from a $4^{th}$ Generation (4G) or Long Term Evolution (LTE) network to an Evolution-Data Optimized (EVDO) network, the registration to EVDO can take up to five seconds. This long handover delay can cause a significant interruption in service, resulting in poor user experiences. Since mobile devices are typically required to register with a base station of any new cell, delays associated with registration can be a frequent occurrence for mobile device users roaming between networks.

There are generally two types of handover, hard handover and soft handover. In a traditional "hard" handover, the connection to the current cell is broken, and then the connection to the new cell is made. This is known as a "break-before-make" handoff. Hard handovers are used mainly in Global System for Mobile communications (GSM) cellular systems, where each cell was assigned a different frequency band. In such systems, a user entering a new cell tears down the existing connection before setting up a new connection at a different frequency in the target cell. The mobile terminal performs a handover, when a signal strength of a neighboring cell exceeds a signal strength of the current cell within a given threshold. In a typical hard handover, users may experience a "click" sound when speech transmissions are stopped momentarily during handovers.

Code division multiple access (CDMA) cellular systems use identical frequencies in each cell. Hence, it is possible to make a connection with a new cell before leaving an old cell. This technique is known as a "make-before-break" or "soft" handover, where a mobile terminal in proximity to a cell boundary can communicate with two or more base stations. Soft handover has been used in CDMA networks, and later in 3G or Universal Mobile Telecommunications System (UMTS) networks. Soft handover maintains two thresholds for its handover decision making. When a pilot signal strength from a base station exceeds a first threshold, the base station (or an identifier associated with the base station) is put into the candidate set. The candidate set may contain more than one base station (or base station identifier) at any time. Depending on changes in the pilot signal strength from the two or more base stations involved, a hard decision will eventually made to communicate with only one base station. This will occur when the signal from one base station is considerably stronger than signals from other base stations, or the signal from one base station exceeds a second threshold. In an interim period (e.g., between two thresholds), the user may have simultaneous communication with all base stations in the candidate set.

Compared to hard handover, soft handover is more complex, requiring additional network resources. On the other hand, soft handover offers the advantage of smoother communications, without a "click" sound typically found in hard handover during speech communications. Soft handover also reduces a "ping-pong" effect of a pilot signal that is continuously added and deleted, which is common in hard handovers. Reducing or eliminating the ping-pong effect reduces traffic load on networks by limiting handover signaling and overhead.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1:
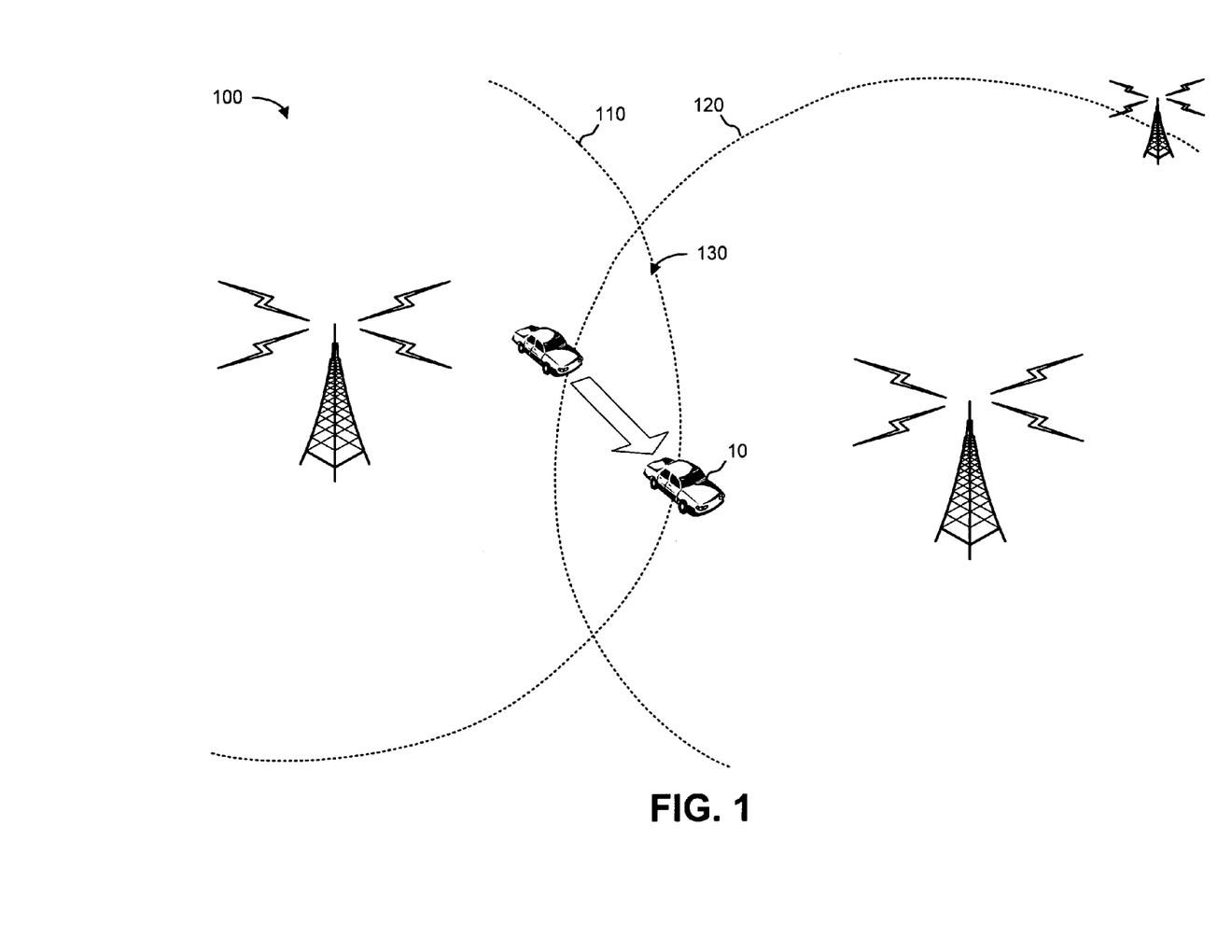
FIG. 1 provides a schematic diagram illustrating an implementation of the systems and/or methods described herein.

Systems and/or methods described herein may provide early registration of a mobile device with a target network prior to a handover. FIG. 1 provides a schematic diagram illustrating an implementation of the systems and/or methods described herein. As shown in FIG. 1, a mobile device (e.g., mobile phone in a vehicle 10) within an environment 100 of multiple wireless access networks may transition from an existing access network 110 to a target access network 120. In an exemplary implementation, existing access network 110 may be a LTE network and target access network 120 may be an EVDO network. Access network 110 and access network 120 may have an area of overlapping coverage 130.

While within the area of overlapping coverage 130, the mobile device (e.g., within vehicle 10) can register with target wireless network 120 a short time period (e.g., about five seconds) in advance of a handover from existing access network 110, so that the delay associated with registration of target access network 120 can be avoided during the actual handover. In the example of a LTE to EVDO handover, the mobile device may initiate early registration to the EVDO network (target access network 120) when a pilot signal from the LTE network (existing access network 110) becomes weak enough (e.g., as defined by a particular threshold value), instead of waiting to completely lose LTE coverage before starting to register and handover to the EVDO network.

As described herein, the mobile device may use the strength level of a pilot signal from existing access network 110 as a trigger point for the early registration. The mobile device may translate the required registration time for a target network into the required pilot strength level at which early registration may take place. Thus, the mobile device can perform early registration with target access network 120 based on pilot signal strength measurements associated with existing access network 110.

In descriptions herein, the case of handover between 4G and EVDO networks will be used as an exemplary implementation. However, in other implementations, any handover cases that may benefit from attachment or registration to a target wireless network in advance of a handover can be used. Thus, applicable types of wireless access technologies may include, for example, a cellular network or a mobile network (e.g., GSM, LTE, Ultra Mobile Broadband (UMB), Code Division Multiple Access (CDMA), Evolved Universal Terrestrial Radio Access Network (EUTRAN), Personal Communications Service (PCS), Time Division Multiple Access (TDMA), third generation (3G), fourth generation (4G), ad hoc, High-Speed Packet Access (HSPA), and the like), and a non-cellular network (e.g., Wireless Fidelity (Wi-Fi), Worldwide Interoperability for Microwave Access (WiMax)), and the like. Also, while two wireless networks are shown in FIG. 1 for simplicity, systems and/or methods described herein may be applied in environments with multiple overlapping wireless networks.

"Handover," as the term is used herein, is intended to be broadly interpreted to refer to the automatic transfer of mobile services from one location to another location, while maintaining continuous service connectivity. Also, the term "user," as used herein, is intended to be broadly interpreted to include a mobile device or a user of a mobile device.

Figure 2:
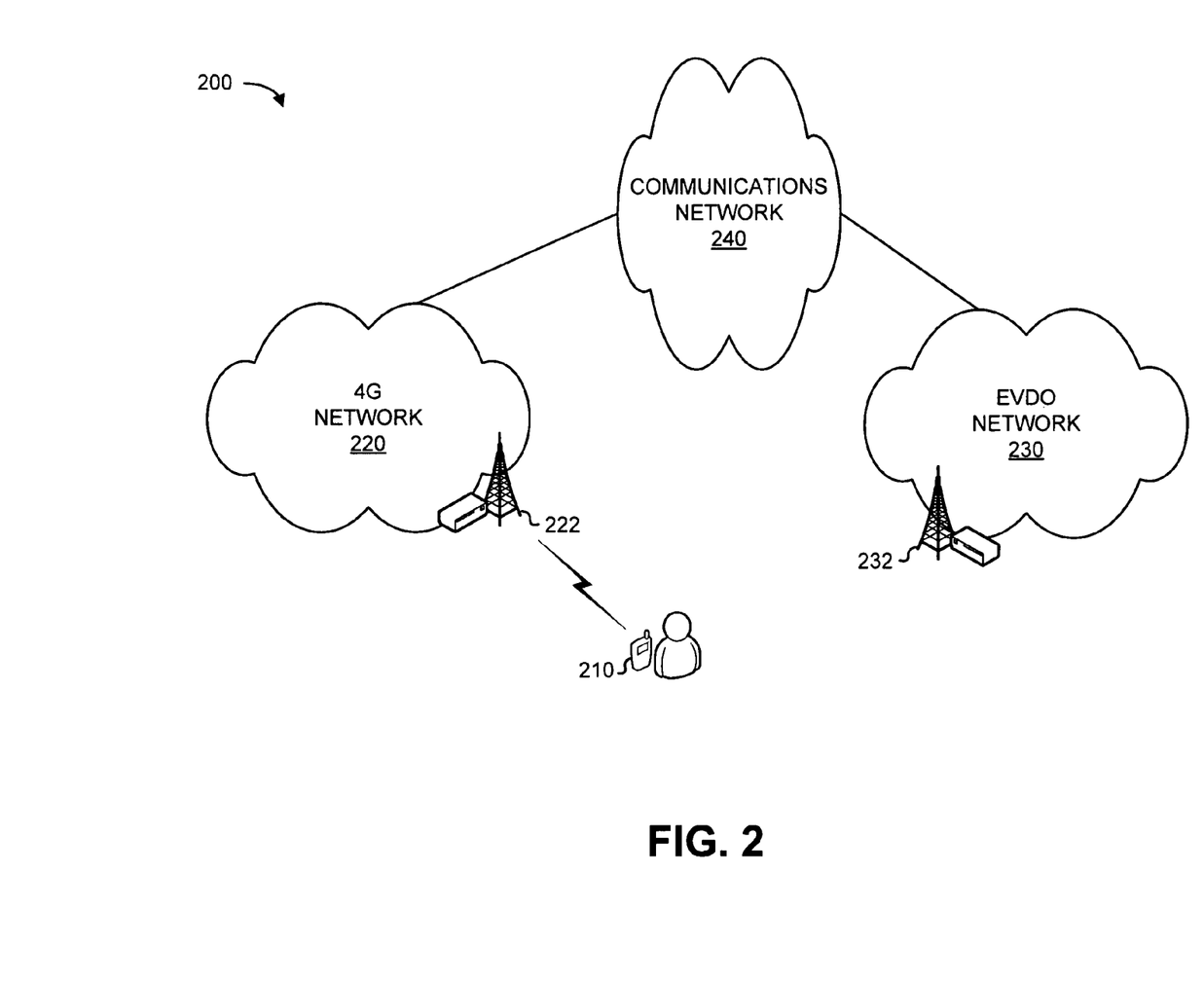
FIG. 2 depicts a diagram of an exemplary network in which systems and/or methods described herein may be implemented.

FIG. 2 is a diagram of an exemplary network 200 in which systems and/or methods described herein may be implemented. As illustrated, network 200 may include a mobile device 210, a 4G network 220, an EVDO network 230, and a communications network 240. Mobile device 210 may generally connect to 4G network 220 and/or EVDO network 230 via wireless connections. 4G network 220 and/or EVDO network 230 may connect to each other and communications network 240 via wired and/or wireless connections.

Mobile device 210 may include any type of device that is able to communicate via a wireless network. For example, mobile device 210 may include any type of device that is capable of transmitting and receiving voice and/or data (e.g., text, images, audio, video, rich text, etc.) to/from 4G network 220 and/or EVDO network 230. In an exemplary implementation, mobile device 210 may include a mobile terminal. As used herein, the term "mobile terminal" may include a cellular radiotelephone; a PCS terminal that may combine a cellular radiotelephone with data processing and data communications capabilities; a personal digital assistant (PDA) that can include a radiotelephone, Internet/Intranet access, and/or multimedia messaging service (MMS) applications; a portable game and/or music playing device; and/or a conventional laptop and/or palmtop receiver or other appliance that includes a radiotelephone transceiver.

4G network 220 may include one or more wide area cellular networks supporting emerging standards for increasingly higher wireless data transfer rates over previous wireless access technologies (e.g., GSM, GPRS, WCDMA/UMTS, etc.). 4G network 220 may include a packet switched (IP-based) network including technologies such as orthogonal frequency-division multiplexing (OFDM) and/or multi-carrier CDMA (MC-CDMA). In addition, 4G network 220 may include mechanisms other than a cellular network, such as, for example, the Internet, a corporate intranet, a Public Switched Telephone Network (PSTN), a metropolitan area network (MAN), a wide area network (WAN), a local area network (LAN), a mesh network, or another type of network.

EVDO network 230 may include one or more wide area cellular networks supporting CDMA access technology, such as a CDMA Evolution-Data Optimized (EVDO) Rev. A and/or CDMA EVDO Rev. 0. In other implementations, EVDO network 230 may support network standards for GPRS, CDMA interim standard 95 (IS-95), CDMA 1xRTT, GSM, or any other network operating on a wireless interface supporting comparatively lower downlink data rates than 4G network 220. In addition, EVDO network 230 may include mechanisms other than a cellular network, such as, for example, the Internet, a corporate intranet, a PSTN, a MAN, a WAN, a LAN, a mesh network, or another type of network.

4G network 220 and EVDO network 230 may include a combination of networks including a cellular network that uses components for transmitting data to and from mobile device 210 and/or communications network 240. Such components may be referred to herein as "base stations," such as a base station 222 and a base station 232. Base stations 222 and 232 may include, for example, base station antennas that transmit and receive data from communication devices within their vicinity. Base stations 222 and 232 may also include base station controllers that connect to the respective base station antennas and communicate with other devices, such as switches and routers (not shown). Although a single base station 222 and 232 is shown for each of 4G network 220 and EVDO network 230 for simplicity, in practice 4G network 220 and EVDO network 230 may include multiple base stations. As described further herein, base stations 222 and 232 may include one or more servers, or other types of computation or communication devices, that gather, process, search, and/or provide information in a manner described herein. In examples used herein, base station 222 for 4G network 220 may be referred to as "existing base station 222," while base station 232 for EVDO network 230 may be referred to as "target base station 232."

Communications network 240 may include one or more networks including another wireless network, a satellite network, the Internet, a telephone network, such as the PSTN, a MAN, a WAN, a LAN, a mesh network, a fiber-optics network (e.g., passive optical networks (PONS)), an ad hoc network, or another type of network. In an exemplary implementation, communications network 240 may include a combination of networks and other components (e.g., switches, routers, etc.) for transmitting data to and from mobile device 210. For example, 4G network 220 and/or EVDO network 230 may connect to communications network 240 to allow mobile device 210 to communicate with services providers and/or other devices. In exemplary implementations, communications network 240 may provide access to an service provider that facilitates voice, text, and/or data services over a proprietary interface and/or protocol.

One mobile device 210, one 4G network 220, one EVDO network 230, and one communications network 240 have been illustrated in FIG. 2 for simplicity. In practice, there may be more or fewer mobile devices 210, 4G networks 220, EVDO networks 230, and/or communications networks 240. Also, in some instances, one or more of mobile device 210, 4G network 220, EVDO network 230, and/or communications network 240 may perform one or more functions described as being performed by another one or more of mobile device 210, 4G network 220, EVDO network 230, and/or communications network 240.

In implementations described herein, mobile device 210 may conduct a soft handover from 4G network 220 to EVDO network 230 using early registration of mobile device 210 with EVDO network 230 (e.g., the target network) prior to any handover from 4G network 220 (e.g., the existing network). A soft handover from an existing base station (e.g., base station 222) to a target base station (e.g., base station 232) can be base-station controlled and mobile-device (e.g., mobile device 210) assisted. Existing base station 222 may specify a parameter to be used for the soft handover process as well as a list of pilot signals used by the neighboring base stations (e.g., including base station 232 and other nearby base stations). As part of the mobile-assisted handoff process, mobile device 210 may provide the existing base station (e.g., base station 222) with pilot signal strength measurements from the neighboring cells. Pilot strength measurements may be provided, for example, as Ec/Io measurements (i.e., a ratio of received pilot energy (Ec) to total power spectral density (Io)). To properly detect and select the best candidate base station for handover among multiple target base stations, mobile device 210 may group the received pilot signals into four different sets. In implementations described further herein, the four sets may be defined as an active set, a candidate set, a neighbor set, and a remaining set. The sets may be updated frequently (e.g., at periodic intervals or near-real time).

Figure 3:
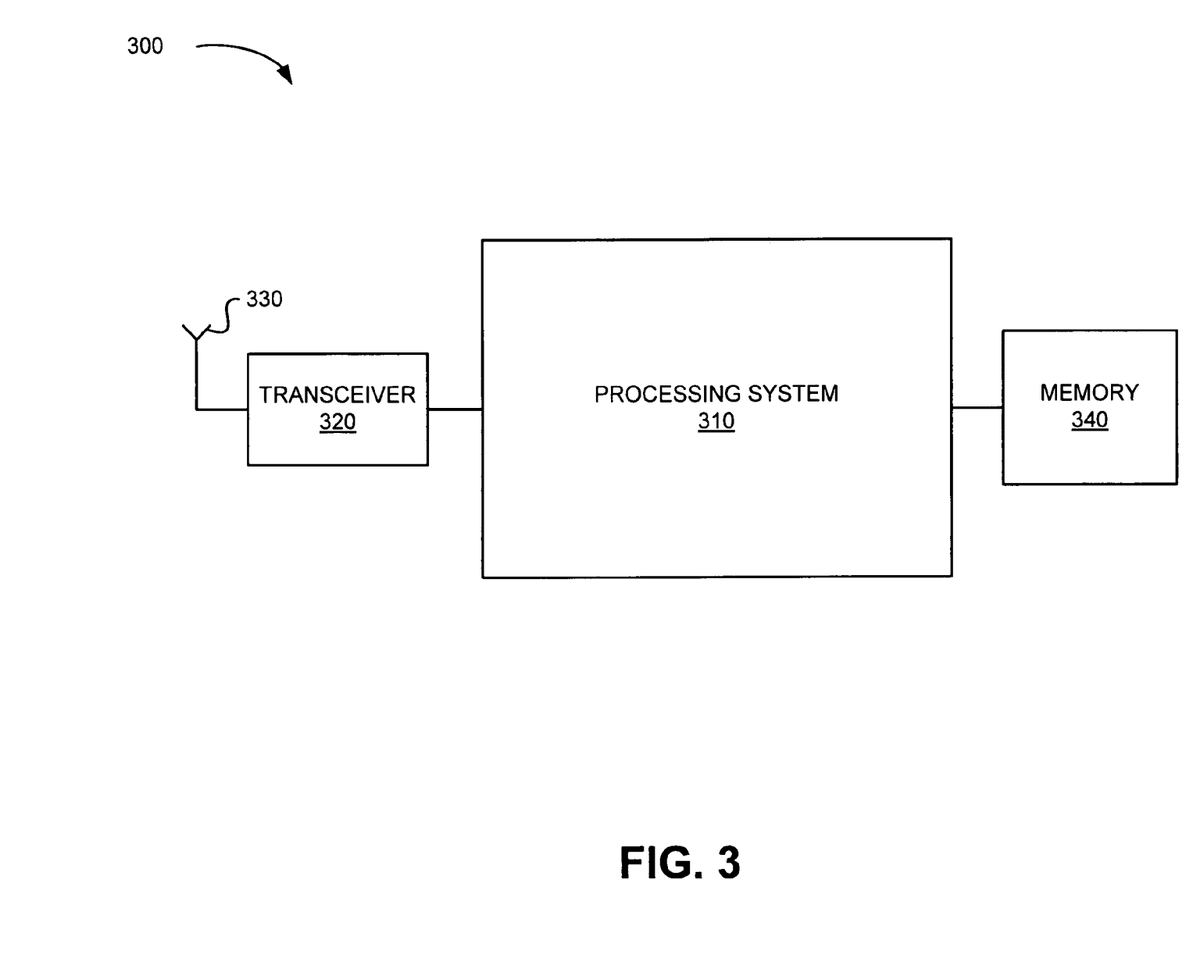
FIG. 3 illustrates exemplary components of a base station and/or a mobile device of the network depicted in FIG. 2.

FIG. 3 depicts a diagram of exemplary components of a wireless station 300 that may correspond to one or more components of base stations 222, 232. As illustrated, wireless station 300 may include a processing system 310, a transceiver 320, an antenna 330, and a memory 340. The term component is intended to be broadly interpreted to include, for example, hardware, software and hardware, firmware, and/or software.

Processing system 310 may include a component capable of interpreting and/or executing instructions. For example, processing system 310 may include a general-purpose processor, a microprocessor, a data processor, a co-processor, a network processor, an application specific integrated circuit (ASIC), a controller, a programmable logic device, a chipset, and/or a field programmable gate array (FPGA). Processing system 310 may control one or more other components of wireless station 105. Processing system 310 may be capable of performing various communication-related processing (e.g., signal processing, channel estimation, beamforming, power control, link adaptation, scheduling, etc.).

Transceiver 320 may include a component capable of transmitting and/or receiving information over wireless channels via antennas 330. For example, transceiver 320 may include a transmitter and a receiver. The transmitter may map symbols into a representation appropriate for the transmission medium or channel (e.g., a radio channel) and may couple the symbols to the transmission medium via antenna 330. The receiver may include, for example, a RAKE or a Generalized RAKE (G-RAKE) architecture. Transceiver 320 may be capable of performing various communicative processing (e.g., de/modulation, de/interleaving, equalizing, filtering, de/coding, amplifying, sampling, forward error correction (FEC), etc.). Antenna 330 may include a component capable of receiving information and transmitting information via wireless channels. Antenna 330 may include a multi-antenna system (e.g., a MIMO antenna system). Antenna 330 may provide one or more forms of diversity (e.g., spatial, pattern, or polarization).

Memory 340 may include a component capable of storing information (e.g., data and/or instructions). For example, memory 340 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Although FIG. 3 shows exemplary components of wireless station 300, in other implementations, wireless station 300 may contain fewer, different, differently arranged, or additional components than depicted in FIG. 3. In still other implementations, one or more components of wireless station 300 may perform one or more other tasks described as being performed by one or more other components of wireless station 300.

Figure 4:
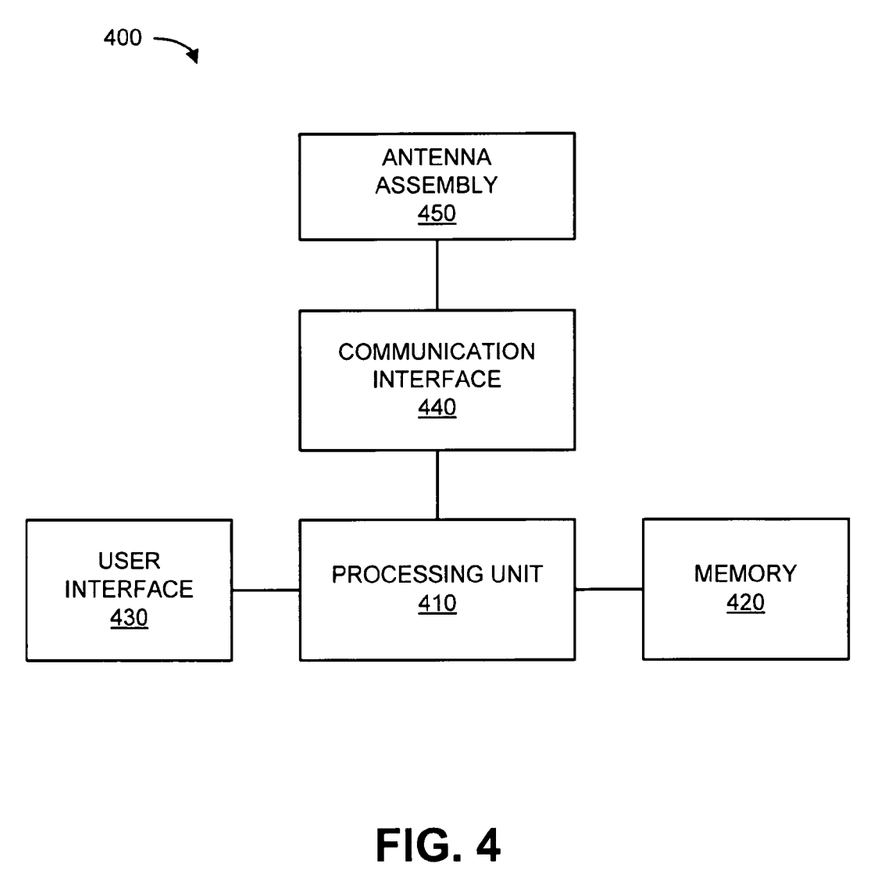
FIG. 4 illustrates exemplary components of the mobile device of the network depicted in FIG. 2.

FIG. 4 illustrates a diagram of exemplary components of a device 400 that may correspond to mobile device 210. As illustrated, device 400 may include a processing unit 410, a memory 420, a user interface 430, a communication interface 440, and/or an antenna assembly 450.

Processing unit 410 may include one or more microprocessors, application-specific integrated circuits (ASICs), field-programmable gate arrays (FPGAs), or the like. Processing unit 410 may control operation of device 400 and its components. In one implementation, processing unit 410 may control operation of components of device 400 in a manner described herein.

Memory 420 may include a random access memory (RAM), a read-only memory (ROM), and/or another type of memory to store data and instructions that may be used by processing unit 410.

User interface 430 may include mechanisms for inputting information to device 400 and/or for outputting information from device 400. Examples of input and output mechanisms might include buttons (e.g., control buttons, keys of a keypad, a joystick, etc.) or a touch screen interface to permit data and control commands to be input into device 400; a speaker to receive electrical signals and output audio signals; a microphone to receive audio signals and output electrical signals; a display to output visual information (e.g., text input into device 400); a vibrator to cause device 400 to vibrate; etc.

Communication interface 440 may include, for example, a transmitter that may convert baseband signals from processing unit 410 to radio frequency (RF) signals and/or a receiver that may convert RF signals to baseband signals. Alternatively, communication interface 440 may include a transceiver to perform functions of both a transmitter and a receiver. Communication interface 440 may connect to antenna assembly 450 for transmission and/or reception of the RF signals.

Antenna assembly 450 may include one or more antennas to transmit and/or receive RF signals over the air. Antenna assembly 450 may, for example, receive RF signals from communication interface 440 and transmit them over the air, and receive RF signals over the air and provide them to communication interface 440. In one implementation, for example, communication interface 440 may communicate with a network (e.g., network 150) and/or devices connected to a network.

As will be described in detail below, device 400 may perform certain operations described herein in response to processing unit 410 executing software instructions of an application contained in a computer-readable medium, such as memory 420. The software instructions may be read into memory 420 from another computer-readable medium or from another device via communication interface 440. The software instructions contained in memory 420 may cause processing unit 410 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may contain fewer, different, differently arranged, or additional components than depicted in FIG. 4. In still other implementations, one or more components of device 400 may perform one or more other tasks described as being performed by one or more other components of device 400.

Figure 5:
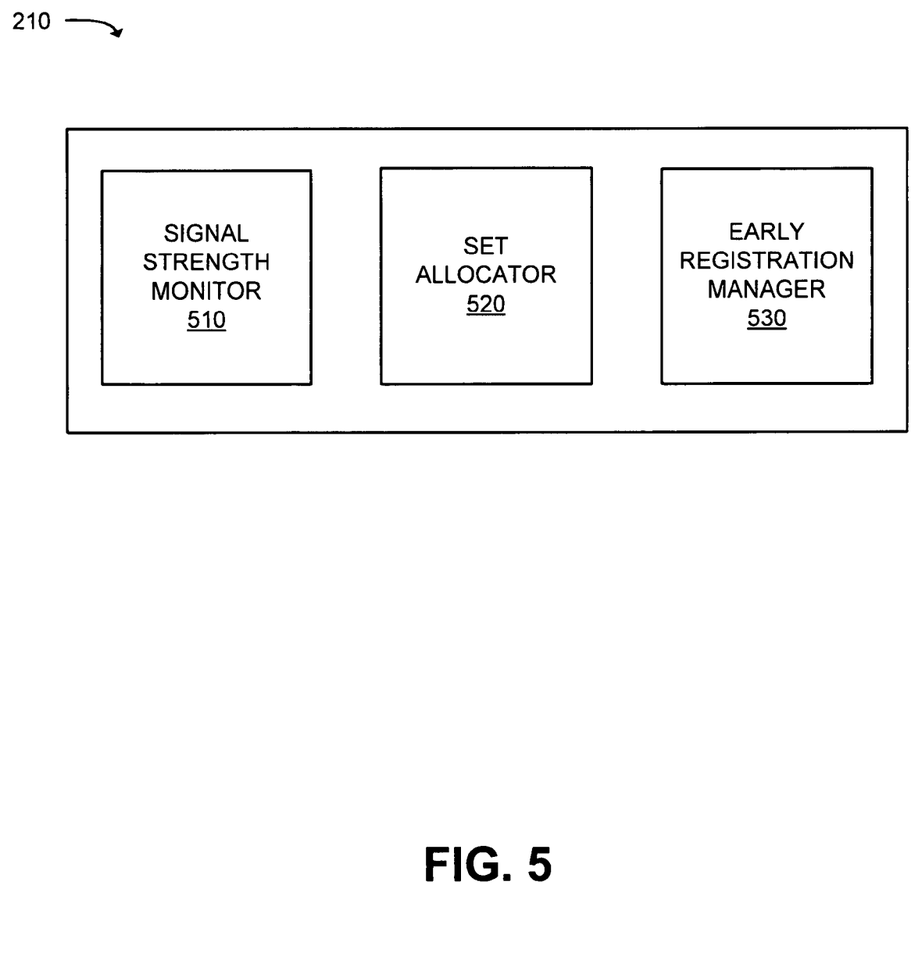
FIG. 5 depicts a diagram of exemplary functional components of the mobile device depicted in FIG. 2.

FIG. 5 depicts a diagram of exemplary functional components of mobile device 210. As shown in FIG. 5, mobile device 210 may include a signal strength monitor 510, a set allocator 520, and an early registration manager 530. In one implementation, signal strength monitor 510, set allocator 520, and early registration manager 530 may be implemented within processing unit 410 and/or memory 420 of mobile device 210.

Signal strength monitor 510 may include hardware or a combination of hardware and software to monitor signal strength for each pilot signal within environment 100. A list of pilot signals used by the neighboring base stations, and to be measured by signal strength monitor 510, may be provided to signal strength monitor 510 from an existing base station (e.g., base station 222). Pilot strength measurements may be provided, for example, as an Ec/Io measurement (i.e., the ratio of received pilot energy (Ec) to total power spectral density (Io)). Signal strength may be monitored periodically (e.g., every few seconds). In an exemplary implementation, signal strength measurements may be provided to set allocator 520 for inclusion in one of the pilot signal sets.

Set allocator 520 may include hardware or a combination of hardware and software to assign pilot signals to a particular set based on parameters for each set. Set parameters may be defined, for example, by an existing base station (e.g., base station 222) or may be stored in a local memory (e.g., memory 420) of device 210. Set allocator 520 may assign each pilot signal to one of four sets, which may be defined as an active set, a candidate set, a neighbor set, and a remaining set.

The active set may include the pilot signals of the base station(s) that are actively in communication with mobile terminal 210. The candidate set may include pilot signals that are strong enough to be considered for soft handover. The neighbor set may include pilot signals for all remaining neighboring base stations that are not included in the active or candidate sets. A list of neighbor pilot signals may be provided from the existing base station to mobile device 210. Because these pilot signals are used by neighboring base stations, they may become candidates and therefore can to be monitored in each periodic measurement. The remaining set may include all possible pilot signals in the current system (e.g., environment 100), excluding the pilot signals in the active set, candidate set, and neighbor set. Each pilot signal can be added to or deleted from one of the active, candidate, neighbor, and remaining sets after comparison with thresholds or parameters described further herein. Set allocator 520 may update the set assignments for each pilot signal at periodic intervals or in near-real time. Set allocations are described further with respect to FIG. 6.

Figure 6:
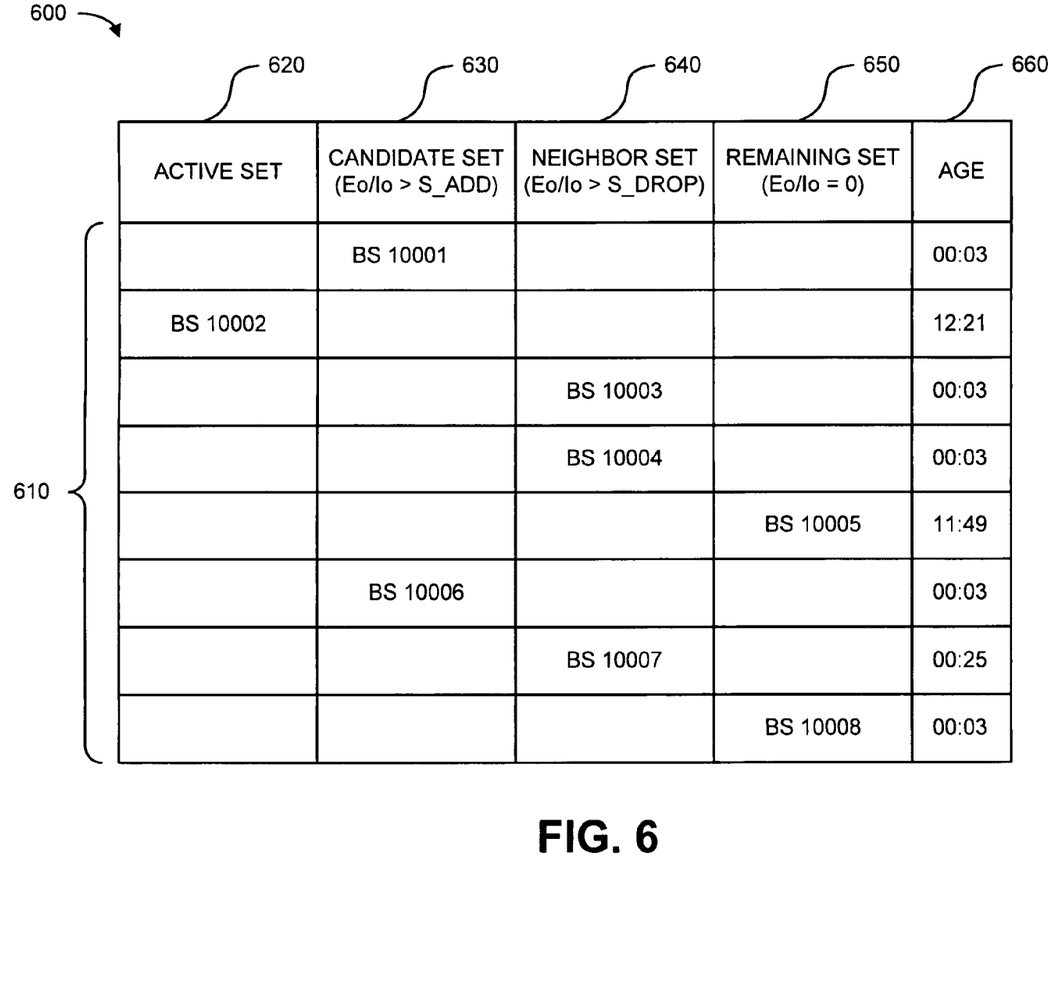
FIG. 6 depicts a portion of an exemplary data structure that may be used by the mobile device depicted in FIG. 2.

FIG. 6 depicts a portion of an exemplary data structure 600 that may be used by mobile device 210 (e.g., by set allocator 520). As illustrated in FIG. 6, data structure 600 may include a variety of information associated with pilot signals received from base stations in environment 100. For example, data structure 600 may include pilot designators 610, an active set field 620, a candidate set field 630, a neighbor set field 640, a remaining set field 650, and an age counter field 660. In one implementation, active set field 620, candidate set field 630, neighbor set field 640, and remaining set field 650 may be populated using pilot designators 610 obtained from an existing base station (e.g., base station 222) and based on signal strength data obtained by mobile device 210.

Pilot designators 610 may include a unique indicator (e.g., an alpha-numeric indicator, a numeric indicator, an IP address, or another designator) for a base station. Within data structure 600, each pilot designator 610 may be associated with one set designation (e.g., active set field 620, candidate set field 630, neighbor set field 640, and remaining set field 650). Active set field 620 may include pilot designators 610 for pilot signals of the base station(s) that are actively in communication with the mobile terminal (e.g., "BS 10002"). Candidate set field 630 may include pilot designators 610 for pilot signals of the base station(s) that are strong enough to be considered for soft handover (e.g., "BS 10001" and "BS 10006"). Neighbor set filed 640 may include pilot designators 610 for pilot signals of base station(s) that are not included in the active set field 620 or candidate set field 630 (e.g., "BS 10003," "BS 10004," and "BS 10007"). Remaining set field 650 may include pilot designators 610 for all possible pilot signals that are not actively being received by mobile device 210 (e.g., "BS 10005" and "BS 10008"). The set allocation (e.g., active set field 620, candidate set field 630, neighbor set field 640, and remaining set field 650) associated with each pilot designator 610 may be changed, for example, after each periodic scan performed by mobile device 210. Age counter field 660 may include time values (e.g., minutes and seconds) that each pilot designator 610 has been allocated within a current set (active set 620, candidate set 630, neighbor set 640, or remaining set 650).

Although FIG. 6 shows exemplary information that may be provided in data structure 600, in other implementations, data structure 600 may contain less, different, differently-arranged, or additional information than depicted in FIG. 6. For example, in another implementation, pilot designators 610 may be listed and simply include a designator (e.g., "A," "C," "N," or "R") to identify a set association with an active set, a candidate set, a neighbor set, a remaining set field.

Returning to FIG. 5, early registration manager 530 may include hardware or a combination of hardware and software to initiate early registration and/or handover procedures based on the allocated pilot signal sets from set allocator 520. Based on set assignments from set allocator 520, early registration manager 530 may initiate early registration with a particular target base station when signal strength measurements from signal strength monitor 510 indicate early registration thresholds have been met.

Figure 7:
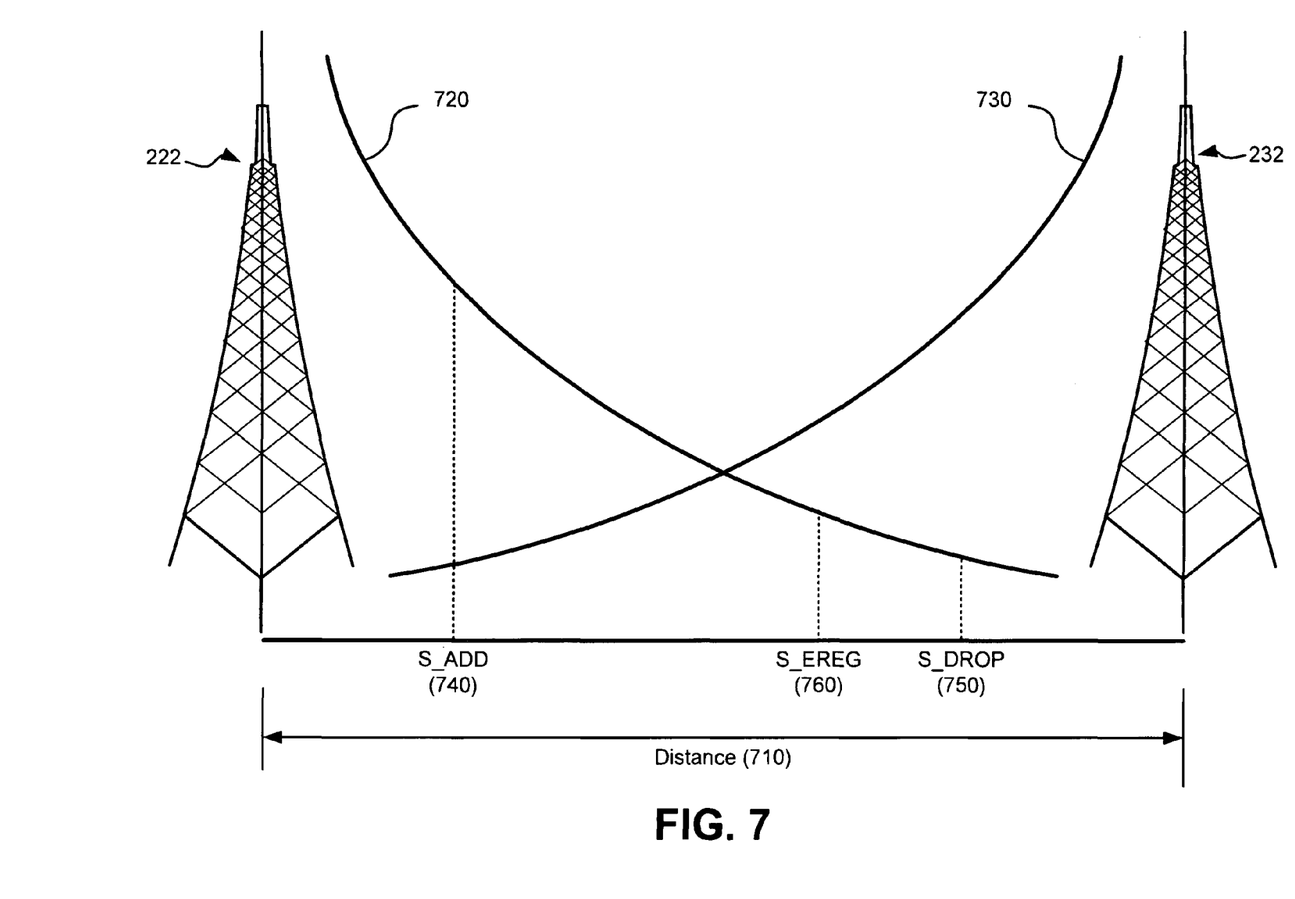
FIG. 7 illustrates a diagram of soft handover thresholds for a transition between two base stations.

FIG. 7 illustrates a diagram of soft handover thresholds for a transition between two base stations. Existing base station 222 and target base station 232 may be separated by a distance 710. Pilot signal strength may vary relative to the location of a mobile device (e.g., mobile device 210, not shown) with respect to existing base station 222 and/or target base station 232. The mobile device's detection of pilot signal strength for existing base station 222 may be represented by line 720; and the mobile device's detection of pilot signal strength for target base station 232 may be represented by line 730. The pilot signal strength measurements may be compared against threshold values to determine the applicable set (e.g., active, candidate, neighbor, or remaining) of each pilot signal. In implementations herein, thresholds based on signal strength may include a pilot detection threshold ("S_ADD") 740 and a pilot drop threshold ("S_DROP") 750.

S_ADD 740 may be used to determine when a pilot signal in the neighbor set or remaining set can be moved to the candidate set. A pilot signal in the neighbor or remaining set may be moved to the candidate set if the pilot signal strength (Ec/Io) is greater than S_ADD 740. S_DROP 750 may be used to determine when a pilot signal in the active set or candidate set can be moved to the neighbor set. A pilot signal in the active set or candidate set may be moved to the neighbor set if the pilot signal strength falls below S_DROP in the period of a drop time threshold ("T_DROP"). Table 1 provides typical values for the handover parameters in Interim Standard 95 (IS-95).

TABLE 1

Sample Handover Parameter Values

| Parameter | Range | Suggested Value |
|---|---|---|
| S_ADD | −31.5 to 0 dB | −13 dB |
| S_DROP | −31.5 to 0 dB | −15 dB |
| T-DROP | 0 to 15 seconds | 2 seconds |

Use of the S_ADD 740 and S_DROP 750 thresholds helps to avoid the ping-pong effect of a pilot signal that is repeatedly added and deleted from a soft handoff. When mobile device 210 is performing a soft handover, two or more pilot signals can be in the active set and mobile device 210 may use traffic channels simultaneously with the cells associated with the active set pilot signals.

Based on pilot signal strength measurements, S_ADD 740 and S_DROP 750 may allow mobile device 210 to soft handover between two base stations (e.g., base stations 222 and 232). An additional threshold, S_EREG 760, can be used to start the registration process in advance, before the pilot signal strength from the existing base station (e.g., base station 222) reaches S_DROP 750. By the time the pilot signal from the existing base station 222 (e.g., the LTE network) reaches S_DROP 750, it would be too late for mobile device 210 to seamlessly handover to the target base station 232 (e.g., the EVDO network), as the registration to EVDO alone can take several seconds. S_EREG 760 may be defined as the threshold level of pilot signal strength that a mobile device can start early registration to avoid registration delay at the actual handover. Thus, S_EREG 760 can be defined in terms of the registration delay to be eliminated via early registration.

Referring collectively to FIGS. 5-7, as mobile device 210 monitors pilot signal strength changes, several different actions may be required, including adding pilot designators 610 to neighbor set field 640, transitioning pilot designators 610 between neighbor set 640 and candidate set 630, transitioning pilot signals between candidate set 630 and active set 620, triggering early registration, and/or triggering a handover.

When adding pilot designators 610 to neighbor set field 640, set allocator 520 may include, in neighbor set 640, any pilot signal specified in a neighbor list message from an existing base station (e.g., base station 222). In an exemplary implementation, neighbor set field 640 can contain at least twenty (20) pilot designators 610. Set allocator 520 may keep an aging counter (e.g., age counter field 660) for each pilot designator 610 in neighbor set 540. The aging counter may be initialized to zero when pilot designator 610 is moved from active set 620 or candidate set 630 to neighbor set 640, and may be incremented whenever a neighbor list update message is received (e.g., from existing base station 222). Pilot designator 610 may be moved from neighbor set 640 to remaining set 650, if the counter exceeds a particular threshold (e.g., as specified by a parameter from a existing base station).

When transitioning pilot designators 610 between neighbor set 640 and candidate set 630, set allocator 520 may base a determination on S_ADD 740 threshold. A pilot signal strength above S_ADD 740 may be considered for candidate set 630. A pilot designator 610 may be removed from candidate set 630 and placed in neighbor set 640, if the strength of the pilot signal associated with the pilot designator 610 drops below S_DROP 750 for longer than the duration specified by the handover drop time expiration threshold (T_DROP). In one implementation, the candidate set 630 may contain at least six pilot designators 610.

When transitioning between candidate and active sets, set allocator 520 may rely on information directly from the base station associated with the pilot signal (e.g., base station 222, base station 232, or another base station). Decisions about when and which pilot designator 610 can be added or removed from active set 620 may be made by the associated base station and indicated to mobile device 210 (e.g., to set allocator 520) in a handover direction message (HDM). In one implementation, a pilot designator can only be added to active set 620, if the existing base station's HDM contains the particular pilot designator to be added to the active set. Regardless of the measured signal strength, set allocator 520 may keep the pilot designator in candidate set 630, if the received HDM does not include the particular pilot designator.

When triggering early registration, early registration manager 530 may initiate early registration for a base station associated with a pilot designator in candidate set 630 or active set 620, if the pilot signal strength from the existing network (e.g., line 720) is at or falls below S_EREG. In one implementation, if more than one pilot designator is in candidate set 630 or active set 640, a strongest pilot signal can be chosen for early registration.

When triggering a handover, early registration manager 530 may test the pilot signal from the existing network to determine if it exceeds threshold S_DROP 750 or not. If the pilot signal from the existing network exceeds S-DROP 750, a pilot designator for the existing network will be provided to or remain in active set 620 or candidate set 630. If the pilot signal for the existing network reaches or falls below S_DROP 750, the pilot signal will be tested against the time threshold T_DROP. If the pilot signal from the existing network stayed in the active set more than the duration of T_DROP, the handover to the target network may be initiated. If the pilot signal from the existing network does not remain in the active set more than the duration of T_DROP, the pilot designator 610 for the existing network may be put into active set 620 or candidate set 630.

Figure 8:
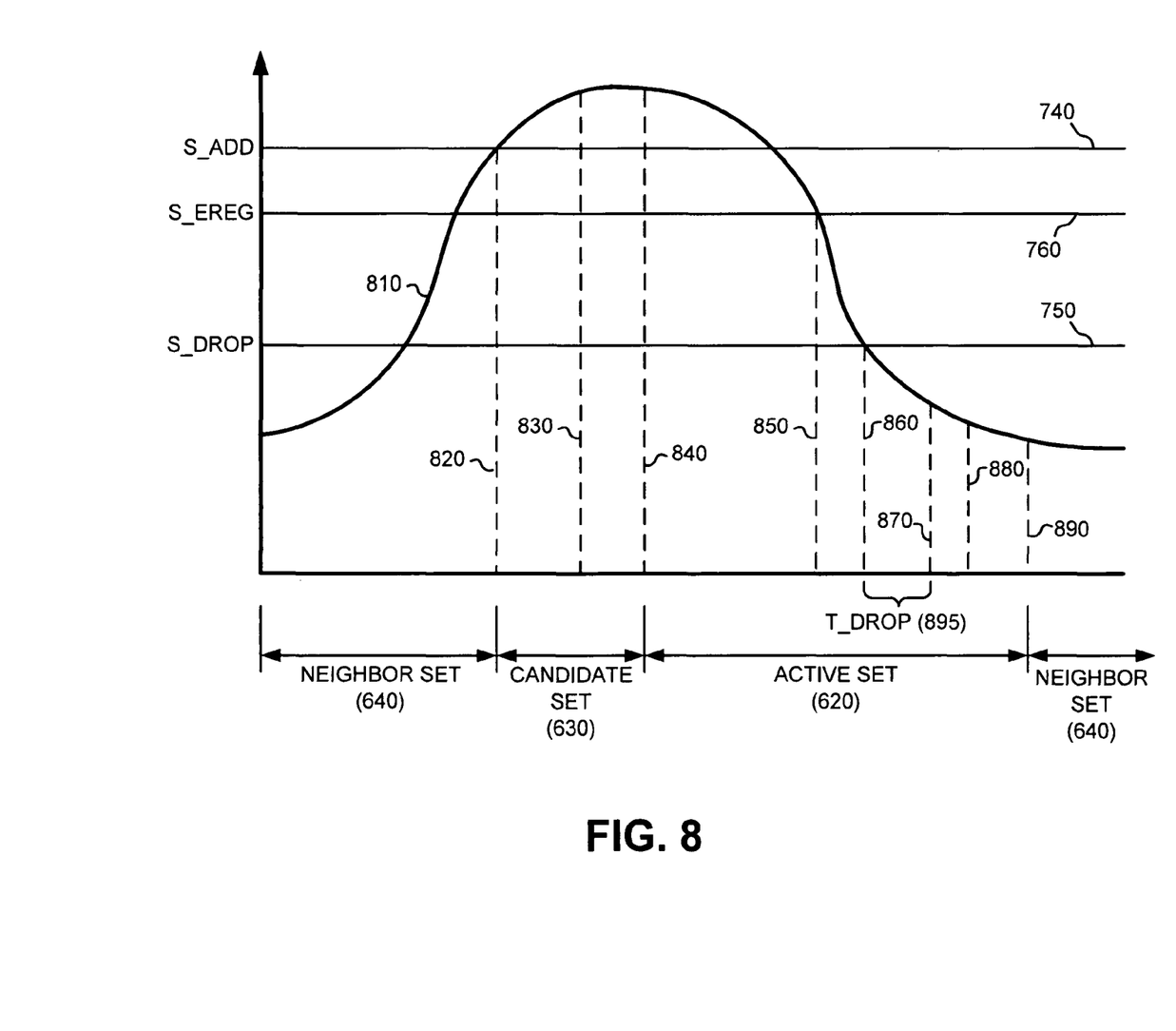
FIG. 8 illustrates a diagram of early registration and pilot transitions for a soft handover from a base station.

FIG. 8 illustrates a diagram of early registration and pilot designator transitions for a soft handover from a base station (e.g., base station 222). Line 810 represents the pilot signal strength of another network (e.g., served by base station 232) in relation to a changing location of mobile device 210. Lines 820-890 show points of steps in the process of early registration and pilot designator transition from neighbor set 640 to candidate set 630 to active set 620 and back to neighbor set 640.

At line 820, the pilot signal strength from the network (as indicated by line 810) exceeds S_ADD 740. Mobile device 210 may send a pilot strength measurement message to base station 232 (e.g., a request to add the network to the active list), and may transfer the pilot designator for the network server by base station 232 from neighbor set 640 to candidate set 630.

At line 830, base station 232 may send an HDM with an indication that the particular pilot signal (e.g., associated with line 810) is in the active set. At line 840, mobile device 210 may transfer the pilot designator for the network associated with base station 232 to active set 620 and may send a handover completion message to the base station 232.

At line 850, the pilot signal strength from the existing network (e.g., associated with base station 232) falls below S_EREG 760. In accordance with implementations described herein, mobile device 210 may start an early registration process to a target network (e.g., to another base station with adequate signal strength for mobile device 210).

At line 860, the pilot signal strength from the existing network drops below S_DROP 750. Mobile device 210 may start the handover drop timer (T_DROP 895) for the pilot signal. At line 870, T_DROP 895 expires. Mobile device 210 may send a pilot signal strength measurement message (e.g., a request to remove the network from active set 620) to the base station 232.

At line 880, base station 232 may send an HDM with an indication that the particular pilot designator be removed from active set 620. At line 890, mobile device 120 may move the pilot designator associated with base station 232 from active set 620 to neighbor set 640. Mobile device 210 may also send a handover completion message to base station 232.

Figure 9:
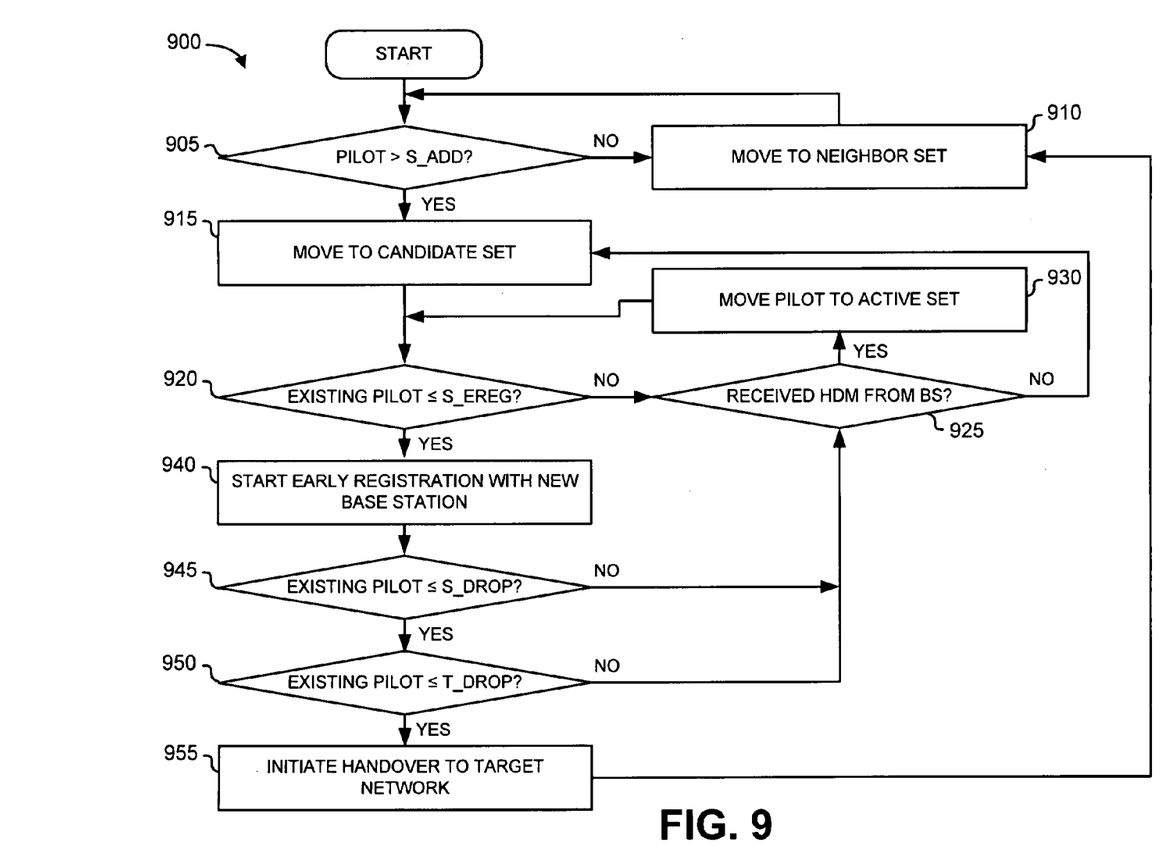
FIG. 9 illustrates a flow chart of an exemplary process for performing a soft handover according to implementations described herein.

FIG. 9 illustrates a flow chart of an exemplary process according to implementations described herein. In one implementation, process 900 may be performed by mobile device 210. In other implementations, some or all of process 900 may be performed by another device or group of devices (e.g., communicating with mobile device 210), such as a base station.

As illustrated in FIG. 9, process 900 may begin with determining whether a strength of a particular pilot signal exceeds a pilot detection threshold (S_ADD) (block 905). For example, mobile device 210 (e.g., set allocator 520) may receive a signal measurement (e.g., from signal strength monitor 510) and compare the signal measurement to the particular threshold for S_ADD 740.

If the strength of the particular pilot signal does not exceed the threshold for S_ADD (block 905—NO), the pilot designator for the pilot signal may be moved to a neighbor set (block 910). For example, in implementations described above in connection with FIG. 6, mobile device 210 (e.g., set allocator 520) may assign pilot designators 610 associated with the pilot signal to neighbor set 640 when the pilot signal strength is less than S_ADD 740. Process 900 may then return to the beginning to receive another signal measurement to compare against S_ADD 740.

If the strength of the particular pilot signal exceeds the threshold for S_ADD (block 905—YES), the pilot designator for the pilot signal may be moved to a candidate set (block 915). For example, in implementations described above in connection with FIG. 6, mobile device 210 (e.g., set allocator 520) may assign pilot designators 610 associated with the pilot signal to candidate set 630 when the pilot signal strength is greater than S_ADD 740.

It may be determined whether the strength of the existing pilot signal is less than or equal to an early registration trigger threshold (S_EREG) (block 920). For example, mobile device 210 (e.g., set allocator 520) may compare a pilot signal measurement for the existing network (e.g., from signal strength monitor 510) with the particular threshold for S_EREG 760.

If the strength of the existing pilot signal is not less than or equal to S_EREG (block 920—NO), it may be determined if a handover direction message (HDM) has been received from the base station (block 925). For example, mobile device 210 (e.g., set allocator 520) may receive an HDM from a base station associated with the pilot signal that confirms the pilot signal is in the active set. If the HDM has been received (block 925—YES), then the pilot signal may be moved to the active set (block 930). For example, mobile device 210 (e.g., set allocator 520) may assign pilot designators 610 associated with the pilot signal to active set 620, and process 900 may then receive another signal measurement to compare against S_EREG 760 at block 920. If the HDM has not been received (block 925—NO), process 900 may then return to block 915 to receive another signal measurement to compare against S_EREG 760.

If the strength of the existing pilot signal is less than or equal to S_EREG (block 920—YES), early registration with the base station may be started (block 940). For example, mobile device 210 (e.g., early registration manager 530) may initiate early registration for a base station associated with a pilot designator in candidate set 630 or active set 620 when the pilot signal strength is less than S_EREG 760.

It may be determined whether the strength of the existing pilot signal is less than or equal to a pilot drop threshold (S_DROP) (block 945). For example, mobile device 210 (e.g., signal strength monitor 510) may determine the signal strength of the pilot signal for the existing network and compare (e.g., using set allocator 520) the signal strength of the pilot signal with threshold S_DROP 750. If the existing pilot signal is not less than or equal to S_DROP (block 945—NO), then process 900 may return to block 925 to determine if an HDM has been received.

If the strength of the existing pilot signal is less than or equal to S_DROP (block 945—YES), it may be determined whether the strength of the existing pilot signal is less than or equal to S_DROP for a handover drop time expiration (T_DROP) (block 950). For example, mobile device 210 (e.g., set allocator 520) may use age counter 660 to determine if the existing pilot signal remains at or below S_DROP 750 for a period longer than T_DROP. If the strength of existing pilot signal is not less than or equal to T_DROP (block 950—NO), then process 900 may return to block 925 to determine if an HDM has been received. If the strength of the existing pilot signal is less than or equal to S_DROP for less than or equal to T_DROP (block 950—YES), a handover to the target network may be initiated (block 955) and the pilot signal for the existing network may be moved to the neighbor set (block 910). For example, mobile device 210 (e.g., early registration manager 530) may initiate a soft handover to a base station associated with a pilot designator in candidate set 630 or active set 620. Mobile device 210 (e.g., set allocator 520) may also move pilot designator 610 associated with (former) existing network from active set 620 to neighbor set 640.

In one implementation, finding the pilot signal strength level at the specified time of registration may include using the International Telecommunication Union (ITU)'s vehicular (outdoor) path loss model. Since pilot signals are continuously monitored by a mobile device (e.g., mobile device 210) and nearby base stations, this pilot signal level can provide a way of initiating early registration. Given the specified time for the early registration, the issue here is then to find the key parameter for early registration: S_EREG—pilot signal level for starting early registration. Based on path loss (attenuation) mode, S_EREG can be derived.

Assume that two base stations (A and B) are placed at d=0 and d=$D_{max}$. The transmitted power of base station A placed at d=0 will experience a path loss f(d), as the mobile device moves from base station A to base station B:

$$f(d)=f(0)-\text{pathloss}(d)=P_0-(33.6\cdot\log_{10}d+120.2) \quad (1)$$

where $P_0$ is the transmitted power at the base station A, and the path loss is given by the ITU vehicular path loss model.

At the pilot signal strength of S_DROP, equation (1) becomes:

$$S\_DROP=P_0-(33.6\cdot\log_{10}D_{S\_DROP}+120.2) \quad (2)$$

Solving for $D_{S\_DROP}$, $$D_{S\_DROP} = 10^{\frac{P_0-S\_DROP-120.2}{33.6}} \quad (3)$$

where $D_{S\_DROP}$ is the distance at which pilot signal strength is S_DROP.

Let $T_{REG}$ be a registration delay associated with the target network. $T_{REG}$ may include a different particular time value for each target network or a generic value suitable for all target networks. Note that, after the pilot signal reaches S_DROP, the mobile device may wait T_DROP seconds before the handover. Therefore, the required time for early registration will be:

$$T_{EREG}=T_{REG}-T\_DROP \quad (4)$$

Assuming a mobile device speed of $\bar{v}$, the distance travelled during $T_{EREG}$ can be:

$$D_{\bar{v}}=\bar{v}\cdot T_{EREG} \quad (5)$$

The mobile device speed, $\bar{v}$, can be estimated via various methods. In one implementation, estimating the speed of mobile terminal may be accomplished using the path loss model. Assume that the time interval is $TI_i=t_{i+1}-t_i$ between two pilot signal reports from the mobile device to base station. The transmitted power from the base station at the time of $t_i$ is:

$$S_i=P_0-(33.6\cdot\log_{10}D_i+120.2) \quad (6)$$

The distance at $t_i$ can be found from (6):

$$D_i = 10^{\frac{P_0-S_i-120.2}{33.6}} \quad (7)$$

Using the same method, the distance at $t_{i+1}$ can be found as:

$$D_{i+1} = 10^{\frac{P_0-S_{i+1}-120.2}{33.6}} \quad (8)$$

Then the speed of the mobile device can be estimated from (7) and (8):

$$\bar{v} = \frac{D_{i+1}-D_i}{t_{i+1}-t_i} \quad (9)$$

The mobile terminals' speed can be averaged over multiple periods, $TI_i, TI_{i+1}, \ldots, TI_{i=n}$. The average may be a simple or weighted average.

$$\bar{v} = \frac{\sum_{i=1}^{n} w_i \cdot \bar{v}_i}{n}, \quad (10)$$

where $w_i$ is the weight factor, $0<w_i\leq 1$.

From equations (4) and (6), the location where an early registration should take place is:

$$D_{EREG}=D_{S\_DROP}-D_{\bar{v}} \quad (11)$$

Using the path loss model, the pilot signal strength at $D_{EREG}$ can be found as:

$$S\_EREG=P_0-(33.6\cdot\log_{10}D_{EREG}+120.2) \quad (12)$$

As soon as the pilot signal reaches the level specified by equation (12), the mobile device can initiate an early registration process to the target network. Therefore, equation (12) provides an indication for when the mobile device can start an early registration during a handover process.

Systems and/or methods described herein may identify a target wireless network for a handover, where the target wireless network uses a different access technology than an existing wireless network being used by the mobile device. A mobile device may determine that a signal for the existing wireless network meets an early registration trigger threshold and initiate, based on the determining, an early registration of the mobile device with the target wireless network. The early registration can be performed at a sufficient time prior to the actual handover to preclude a registration delay associated with the handover to the different access technology.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 9, the order of the blocks may be modified in other implementations. Further, non-dependent blocks may be performed in parallel.

It will be apparent that aspects, as described herein, may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code--it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    identifying, by a mobile device, a target wireless network for a handover,
        the target wireless network using a different access technology than an existing wireless network being used by the mobile device;
    determining, by the mobile device, that a strength of a signal for the existing wireless network is less than or equal to an early registration trigger threshold that triggers an early registration of the mobile device with the target wireless network;
    initiating, by the mobile device, the early registration of the mobile device with a target base station of the target wireless network after determining that the strength of the signal is less than or equal to the early registration trigger threshold and before determining to initiate the handover from an existing base station of the existing wireless network to the target base station of the target wireless network,
        the early registration being performed a period of time before the handover to the target wireless network, and
        the period of time being sufficient to eliminate a registration delay associated with the handover to the target wireless network; and
    initiating, by the mobile device and after the period of time, the handover from the existing base station of the existing wireless network to the target base station of the target wireless network,
        the early registration of the mobile device with the target base station of the target wireless network being different from procedures of the handover from the existing base station of the existing wireless network to the target base station of the target wireless network.

2. The method of claim 1, where identifying the target wireless network comprises:
    determining whether a signal strength of a pilot signal for the target wireless network is greater than a different threshold; and
    assigning the pilot signal to a candidate set of possible wireless networks for the handover when the signal strength of the pilot signal is greater than the different threshold.

3. The method of claim 1, where identifying the target wireless network further comprises:
    receiving a handover direction message from the target base station of the target wireless network; and
    assigning, before initiating the early registration of the mobile device with the target wireless network and based on the handover direction message, a pilot signal to an active set of wireless networks that are in communication with the mobile device.

4. The method of claim 1, where initiating the handover comprises:
    determining whether the strength of the signal for the existing wireless network is less than or equal to a different threshold for a particular period of time; and
    initiating, after the early registration, the handover to the target base station of the target wireless network when the strength of the signal for the existing wireless network is less than or equal to the different threshold for the particular period of time.

5. The method of claim 4, where the early registration trigger threshold is based on a duration of the registration delay and the particular period of time.

6. The method of claim 5, further comprising:
    determining a speed of the mobile device,
        the early registration trigger threshold being further based on the speed of the mobile device.

7. The method of claim 6, where determining the speed of the mobile device comprises:
    determining a distance traveled, by the mobile device, during a fixed time interval between two pilot signal strength measurements; and
    determining the speed based on the distanced traveled by using a path loss model.

8. The method of claim 1,
    where the existing wireless network is a Long Term Evolution (LTE) network, and
    where the target wireless network is an Evolution-Data Optimized (EVDO) network.

9. The method of claim 1, further comprising:
    determining, after initiating the handover, whether the strength of the signal for the existing wireless network is less than or equal to a different threshold for a particular period of time; and
    moving a pilot designator, to a neighbor set of wireless networks that are not being used by the mobile device, from a candidate set of possible wireless networks for the handover, when the strength of the signal for the existing wireless network is less than or equal to the different threshold for the particular period of time.

10. The method of claim 1, further comprising:
    maintaining, in a data structure, information about one or more possible wireless networks for the handover,
        the one or more possible networks comprising the target wireless network.

11. A mobile device comprising:
    a processor to:
        identify a target wireless network for a handover,
            the target wireless network using a different access technology than an existing wireless network being used by the mobile device,
        determine that a strength of a signal for the existing wireless network is less than or equal to an early registration trigger threshold that triggers an early registration of the mobile device with the target wireless network,
        initiate an early registration of the mobile device with a target base station of the target wireless network after determining that the strength of the signal is less than or equal to the early registration trigger threshold and before determining to initiate the handover from an existing base station of the existing wireless network to the target base station of the target wireless network,
            the early registration being performed a period of time before the handover to the target wireless network,
            the period of time being sufficient to eliminate a registration delay associated with the handover to the target wireless network, and
        initiate the handover from the existing base station of the existing wireless network to the target base station of the target wireless network after the early registration,
            the early registration of the mobile device with the target base station of the target wireless network being different from procedures of the handover from the existing base station of the existing wireless network to the target base station of the target wireless network.

12. The device of claim 11, where, when identifying the target wireless network, the processor is to:

determine whether a signal strength of a pilot signal for the target wireless network is greater than a different threshold, and assign the pilot signal for the target wireless network to a candidate set of possible wireless networks for the handover when the signal strength of the pilot signal is greater than the different threshold.

13. The device of claim 11, where the processor is further to:

send a pilot strength measurement message to the target base station of the target wireless network before determining that the strength of the signal for the existing wireless network is less than or equal to the early registration trigger threshold.

14. The device of claim 11, where, when initiating the handover, the processor is to:

determine whether the strength of the signal for the existing wireless network is less than or equal to a different threshold for a particular period of time; and initiate, after the early registration, the handover to the target base station of the target wireless network when the strength of the signal for the existing wireless network is less than or equal to the different threshold for the particular period of time.

15. The device of claim 14, where the early registration trigger threshold is based on a duration of the registration delay, a duration of the particular period of time, and a speed of the mobile device.

16. The device of claim 11, where the existing wireless network is a Long Term Evolution (LTE) network, and where the target wireless network is an Evolution-Data Optimized (EVDO) network.

17. A non-transitory computer-readable medium comprising instructions, the instructions comprising:

one or more instructions, executable by at least one processor of a mobile device, to identify a target wireless network for a handover, the target wireless network using a different access technology than an existing wireless network being used by the mobile device;

one or more instructions, executable by the at least one processor, to determine that a strength of a signal for the existing wireless network is less than or equal to an early registration trigger threshold that triggers an early registration of the mobile device with the target wireless network; and one or more instructions, executable by the at least one processor, to initiate an early registration of the mobile device with a target base station of the target wireless network after determining that the strength of the signal is less than or equal to the early registration trigger threshold and before determining to initiate the handover from an existing base station of the existing wireless network to the target base station of the target wireless network, the early registration being performed a period of time before the handover to the target wireless network, and the period of time being sufficient to eliminate a registration delay associated with the handover to the target wireless network; and one or more instructions, executable by the at least one processor, to initiate, after the period of time, the handover from the existing base station of the existing wireless network to the target base station of the target wireless network, the early registration of the mobile device with the target base station of the target wireless network being different from procedures of the handover from the existing base station of the existing wireless network to the target base station of the target wireless network.

18. The computer-readable medium of claim 17, where the instructions further comprise:

one or more instructions to determine the early registration trigger threshold based on the registration delay, a speed of the mobile device, and the strength of the signal for the existing wireless network.

19. A method comprising:

identifying, by a mobile device, a target wireless network for a handover, the target wireless network using a different access technology than an existing wireless network being used by the mobile device;

calculating, by the mobile device, a signal strength threshold for triggering an early registration of the mobile device with the target wireless network, the early registration being performed a period of time prior to the handover to eliminate a registration delay associated with the handover to the target wireless network;

determining, by the mobile device, that a strength of a signal for the existing wireless network is less than or equal to the signal strength threshold;

initiating, by the mobile device and based on the determining, the early registration of the mobile device with a target base station of the target wireless network after determining that the strength of the signal is less than or equal to the signal strength threshold and before determining to initiate the handover from an existing base station of the existing wireless network to the target base station of the target wireless network; and initiating, by the mobile device and after the period of time, the handover from the existing base station of the existing wireless network to the target base station of the target wireless network, the early registration of the mobile device with the target base station of the target wireless network being different from procedures of the handover from the existing base station of the existing wireless network to the target base station of the target wireless network.

20. The method of claim 19, where the signal strength threshold is based on:

the registration delay, the registration delay being an expected registration duration associated with the target wireless network, a speed of the mobile device, and the strength of the signal for the existing wireless network.

* * * * *